United States Patent
Randle et al.

(10) Patent No.: US 6,594,647 B1
(45) Date of Patent: *Jul. 15, 2003

(54) REAL TIME BANK-CENTRIC UNIVERSAL PAYMENT SYSTEM

(75) Inventors: William Randle, Bexley, OH (US); Richard Ercole, Westerville, OH (US); Terry L. Geer, Pickerington, OH (US); David L. James, Dublin, OH (US); Jodie M. Fredelake, Columbus, OH (US); Dennis Roman, Novato, CA (US); Fabio Fontana, Mountain View, CA (US); Rick Bartlett, Saratoga, CA (US); Ruth Rosenberg, Lafayette, CA (US); Robert W. Murphy, Lafayette, CA (US); Tuong T. Tran, Mountain View, CA (US); Paul Lampru, Roswell, GA (US)

(73) Assignees: Huntington Bancshares Incorporated, Columbus, OH (US); Hewlett-Packard Company, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/463,518
(22) PCT Filed: Jul. 30, 1998
(86) PCT No.: PCT/US98/15780
§ 371 (c)(1), (2), (4) Date: Sep. 19, 2000
(87) PCT Pub. No.: WO99/07102
PCT Pub. Date: Feb. 11, 1999

Related U.S. Application Data

(63) Continuation of application No. 08/903,102, filed on Jul. 30, 1997, now Pat. No. 5,974,146.

(51) Int. Cl.[7] .............................................. G06F 17/00
(52) U.S. Cl. ............................ 705/77; 705/70; 705/80; 705/44; 705/40
(58) Field of Search .............................. 705/77, 40, 44, 705/42, 35, 27, 70, 78, 79

(56) References Cited

U.S. PATENT DOCUMENTS 5,952,638 A * 9/1999 Demers et al. ............. 235/379
5,974,146 A * 10/1999 Randle et al. ................ 705/40

(List continued on next page.)

FOREIGN PATENT DOCUMENTS

| WO | WO 9613814 A1 | * | 5/1996 | ............ G07F/7/08 |
| WO | WO 9745814 A1 | * | 12/1997 | ............ G07F/7/08 |
| WO | WO 9907102 A1 | * | 2/1999 | ............ H04L/9/00 |

OTHER PUBLICATIONS

Manfred Lilge, Evolution of Prepaid Service Towards a Real–Time Payment system, Mar. 2001, IEEE, 195–198.*

Primary Examiner—James P. Trammell
Assistant Examiner—Firmin Backer
(74) Attorney, Agent, or Firm—Porter Wright Morris & Arthur LLP

(57) ABSTRACT

An infrastructure for a real time bank-centric universal payment system (2) in which a central processing system (CPU) defines an electronic commerce trust system (1) formed from a plurality of financial service provider members (4) subscribing to a common standard having applicability throught the infrastructure. The central processing unit is operatively interconnected to the correspondent processing units of financial service provider members (4) that in turn are operatively interconnected through access mechanisms to a network of customers (3) and goods and services providers (5) who are account subscribers with the financial service provider member (4) and subject to the common standard of the system. The CPU provides non-revocable real time debit and credit transactions and effects net settlement between and among members through a central exchange monetary system. Features of the infrastructure include ECTS hot file, bill presentment and payment options and provider designed services that enhance brand identity.

4 Claims, 13 Drawing Sheets

U.S. PATENT DOCUMENTS 6,029,150 A * 2/2000 Kravitz ........................ 705/39
6,049,786 A * 4/2000 Smorodinsky ............... 705/34
6,343,284 B1 * 1/2002 Ishikawa et al. .............. 705/44

* cited by examiner

REAL TIME BANK-CENTRIC UNIVERSAL PAYMENT SYSTEM

RELATED APPLICATION

This is a continuation of U.S. application Ser. No. 08/903,102, filed on Jul. 30, 1997, now U.S. Pat. No. 5,974,146, Real Time Bank-centric Universal Payment System, issued on Oct. 26, 1999.

FIELD OF THE INVENTION

This invention relates to a bank-centric real time payment system of universal applicability that facilitates electronic transaction services.

BACKGROUND AND OBJECTS OF THE INVENTION

The current financial transaction payment system is undergoing change in response to developments in information technology. Software and information media providers are seeking aggressively to disintermediate banks from their traditional customers. New entrants are more often than not non-banks with different regulatory constraints that purport to offer less costly infrastructures that are proposed to provide traditional banking services. The software and media industries seek to integrate the movement of information with the movement of money. It is an objective of the invention to preserve banks as a focus of payment transactions and to create a bank-centric link between information and payments. Fulfilling this objective, the invention allows banks to capitalize on their traditional position in payment systems and to lead in commerce in the introduction of new payment infrastructures. The invention allows banks to continue to focus on core competencies such as preservation and development of existing customer relationships, expansion of market presence and expertise in risk management, while growing the role banks play in providing value added transactional information.

The invention provides a bank-centric system that leads in electronic commerce initiatives, that develops value added information services, and that ensures soundness in new and existing payment systems. To fulfill these objectives, the invention establishes a framework that enables banks to continue to perform the critical role of trust, to lead migration to the virtual world, to create innovative value added information services, and to set the foundation for new real time payment transaction systems.

The invention provides an electronic commerce trust system as a new real-time payment infrastructure (ECTS) that integrates payment functions with information, offers multiple and secure access through public and private networks, and has a capability to utilize a wide range of access mechanisms, including smart-cards, ATM's, kiosks, TV set-tops, hand-held devices, personal computers and other network access devices. The payment system ensures that the information supporting a financial transaction is controlled by the principal parties to the purchasing process: the buyer, the seller and their respective financial institutions. The electronic commerce trust system of the invention encourages adoption of electronic payments by setting standards and certifying hardware and software components and ensures interoperability while maintaining the soundness of the payments infrastructure. As a result, banks can focus on providing value added services and will expand their customer relationships from that of a facilitator of payment transactions to that of a provider of value-added information as a transaction intermediary.

Currently about 85% of all consumer transactions in the United States are based on paper, a further 13% involve consumer use of paper and plastic. According to the Institute for the Future, the transition to electronic payments for consumers will be steady for the next decade. The share (in volume) of payments made by cash or check is expected to decline from 85% today to about 60% in 2005. At the same time, the share of payments made electronically is forecast to rise from about 2% today to about 18% by 2005. Id.

Payments for regular monthly bills that account for around 60% of all checks written are expected to migrate to some form of credit card or electronic payment. Ibid. In addition, consumer and corporate customer preference for credit cards, debit cards and emerging E-cash systems are projected to take over as much as 13% of cash payments. The use of smart cards is similarly expected to expand as government units such as states and counties begin to use smart cards as a mechanism for benefit payments.

Within this perspective, financial institutions, merchants and corporations have made substantial past investments in building and in maintaining existing payments infrastructures that position banks at the center of the transfer of payment value. This present infrastructure, which was costly to develop and is expensive to maintain, may inhibit financial institutions from developing new media and information distribution channels that may threaten to render the past investment obsolete.

While traditional financial institutions support the evolution of payment mechanisms, opportunities for new electronic payment and information services are also being taken up by non-financial institutions, including telecommunications companies, technology providers and other non-banks. If banks' traditional roles diminish in the absence of new bank-centric infrastructure development, bank revenues for value-added and basic services will continue to decline—while simultaneously—the risk of the transaction will remain with the banks.

The invention allows banks to continue to play a critical and value-added role in payments systems for a new era, by providing specifications of new technologies and forms of payment transactions that interoperate with other existing and emerging payment systems as customers continue simultaneously to use both old and newly emerging payment mechanisms.

It is the object of the invention to foster the growth and development of electronic banking in an open environment that will encourage greater choices in banking software, access devices, and the development of more efficient processing capabilities for the benefit of bank customers. Further objectives are to accelerate the establishment of new electronic payment and product delivery systems by facilitating the development of interoperable specifications and standards; to create through a certification process for providers of banking products an environment for a safe and secure electronic infrastructure that will enhance bank brands and safeguard consumer privacy; to enhance consumer confidence by way of a standardized and unique acceptance or certification mark; and to evaluate the feasability of industry-driven payment certification and real-time transactions or settlement. The invention will improve access to banking services for the largest number of people, enhance and support bank brands, and serve as a benchmark infrastructure for bank-centric electronic transaction information delivery systems and electronic payment systems.

The system of the invention is described more fully by reference to the following description of the preferred embodiment considered with the drawings in which:

DESCRIPTION OF THE PREFERRED EMBODIMENT

Figure 1A:
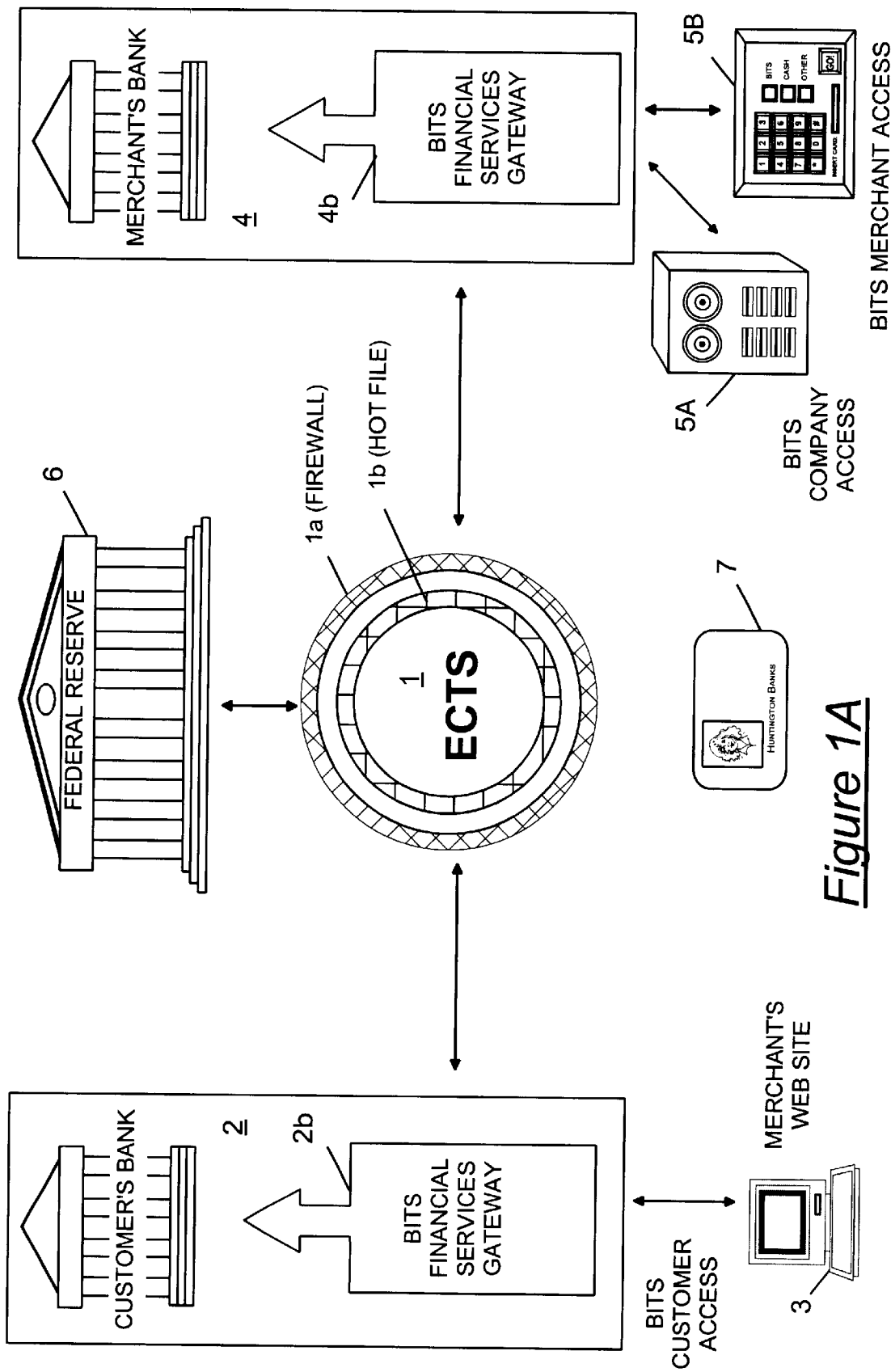
FIGS. 1A and 1B are charts of the overall system showing the relationship of the ECTS to the Federal Reserve or other central banking authority.

The invention provides a new infrastructure method and system controlled and owned by member banks called the electronic commerce trust system (ECTS or ECTC). The infrastructure is a real time bank-centric universal payment system comprising a central processing unit (CPU) defining the electronic commerce trust system (ECTS). The system is formed from a plurality of financial service provider members subscribing to a common standard having applicability throughout the infrastructure. As a master controller of the system, the central processing unit is operatively interconnected to a correspondent processing unit at each one of the plurality of financial service provider members that form the overall system. The master system CPU controller is interconnected to a central monetary exchange mechanism. The CPU controller maintains an encryption means for authenticating and validating users of the system, and for restricting use of the system to subscribing members.

In the system, the correspondent processing units of the financial service provider members are operatively interconnected through access mechanisms to a network of customers and goods and services providers who are account subscribers with the financial service provider member and subject to the common standard of the system. The central processing unit provides non-revocable real time debit and credit transactions between and among accounts of the subscribers upon verification by the encryption means of the central processing unit of the authenticity of the originator and recipient of a debit/credit instruction received by the central processing unit and the availability of funds in the account to be debited in a sufficient amount such that funds are available for transfer to the account to be credited. In the operation of the system, the central processing unit maintains in substantially real time a record of the aggregate debits and credits between and among the financial service provider members resulting from transactions of the member's account subscribers. At a predetermined time interval net settlement of accounts of the provider members is effected by the transmission of the record of aggregate debits and credits of the members by the central processing unit to a central monetary exchange mechanism.

A "hot file" surrounds the ECTS much as a conventional firewall; however, the hot file will contain an archive of lost, stolen or discontinued user cards, will verify consumer and merchant accounts, and will perform an identification protocol to assure that the consumer or merchant seeking access is in fact authentic as a valid account.

The ECTS represents banks, maintains the banks' central role in payments and fulfills three major functions: (1) as an authorization body with responsibility for setting standards for electronic transaction products and services; (2) as an operational organization with responsibility for specifying, implementing and operating new payment systems; and (3) as a provider of value added services to bank members and their customers.

As an authorization body, the ECTS is a trust authority for the banks on behalf of their customers having a major ongoing responsibility to identify the evolving payment needs of its members and its members' customers. The assessment of these needs will drive the requirements for other ECTS activities such as setting standards and policies, creating an acceptance or certification mark and setting regulations for use of the mark, authorizing certificates and setting rules for issuance of digital signatures.

The ECTS will define and set standards and policies for new payment infrastructures, transaction formats and protocols, security and privacy standards, acceptance marks and certification processes, legal and audit requirements, network architecture and interoperability and compatibility standards, and national and global frameworks. The ECTS will certify companies that meet threshold requirements to raise customers' confidence in the system and to encourage participation in the infrastructure. The acceptance mark would cover hardware, software and services. The ECTS will authorize certificates for digital signatures and set rules for issuance. Depending on the authentication requirements of the parties involved in a financial transaction, a certificate endorsed or issued by an independent third-party may be necessary. Under these circumstances, the ECTS is the endorser, or issuing authority, as well as the guarantor of identification of the parties to a transaction. Because many emerging payment mechanisms exist without fully formulated regulations, the ECTS would seek adoption of regulatory and legal standards and coordinate the submission of member's views to government agencies.

As a second major function in operating new payments systems, the ECTS will be: (1) a central clearing house (e.g., to affect net settlement among members), (2) a gateway (i.e., to provide routing and switching services for transactions), (3) an issuer of bank branded digital cash, (4) an issuer of authentication or identity certificates, (5) an operator of the certification process, (6) a provider of value added transaction information, and (7) a record archive.

As a central clearing house, the ECTS addresses needs centrally on behalf of banks, particularly the clearing of real-time payments and the exchange of different digital cash mechanisms. The payment infrastructure provided by ECTS has switching and routing services allowing ECTS to act as the central switch between new and existing payment systems. The ECTS provides the necessary economies of scale and the acceptance mark for digital cash to create customer confidence. In addition to creating the standards for certificates, the ECTS is a central certificate authority performing public key generation, the issuance and renewal of keys and certificates and the manager of the certificate repository. Linked with public key technology is the need for chip cards or smart cards to securely store a private key to allow it to be carried by the users, but prevent its duplication. A goal for the ECTS is to foster the development of a national and international open public key certification infrastructure based on smart card technology. Finally, as in the traditional payments world, there is a requirement to certify hardware and software devices which interface with financial networks. Given the many access options, such as browsers, PC software, kiosks, ATM's, telephones and terminals, TV set-tops, personal digital assistants, etc., the ECTS will set standards and operate a streamlined and cost-effective certification process. The ECTS will provide value added services to its members and their customers within a privacy framework and will become the record repository for numerous transactions and their related payment information. The ECTS will provide bill presentment/payment services, loyalty programs and value added information services that enhance bank brand identity.

Overall, the requirement for a payment system includes balancing the cost of the transaction with the risk of fraud while providing an appropriate balance between the rights of each of the parties involved in the financial transaction. The combination of new technologies and new non-banking players is creating and reducing risks at the same time. Risks are increasing because, firstly, new payment infrastructures such as the internet currently have lowered security, and secondly, many new service providers are less regulated. On the other hand, new technologies, such as a smart card, offer the potential of decreasing risk by providing higher authentication and non-repudiation. The real-time payment system of the invention will reduce fraud, reduce risk, and enhance further advances in electronic commerce.

Real time payment is achieved when dollar value and goods or services are exchanged simultaneously or when a bill payment instruction triggers an instantaneous transfer of money between accounts. In the former case, ATM's and on-line debit POS (point of sale) transactions provide the illusion of a simultaneous exchange of payment and goods or services, occurring when monies are transferred by way of posting entries from the buyer's account to the seller's account, typically, but not necessarily always, via the buyer's and seller's financial institutions. These transactions are, however, generally low or modest dollar value. In the bill payment example, payment occurs either after the actual use of the goods or services, typically when the merchant and consumer are not at the same place at the same time. After the customer is presented with the bill, the customer is able to determine a current or future payment date. Current services do not, however, address the need to know when the actual payment has been received by the biller. In current systems, the debit and/or credit may be posted and the transfer of funds settled at a later time. The ECTS real time system eliminates the delay between posting and actual funds transfer and insures that the funds are "real time" real funds.

Another attribute of a real-time payment system is to provide finality of the transaction. Today, Fedwire is the only system providing irrevocable payment. However, Fedwire is limited by dollar value (only very large transactions) and accessibility (serving relatively few institutions). Finality is desirable by the recipient of funds and the banks involved but not necessarily by the payee, unless there is an incentive, such as lower price, motivating the customer to use a particular transaction form. In addition, the cost of a finality system needs to be in-line with the value of the transaction and the associated risk. For example, real-time finality may be considered important only for large value transactions. While the current payments system environment meets some of the attributes for a real time payment system defined above, they are largely focused on consumer requirements and are not inherently final.

The following attributes are built into the ECTS infrastructure to provide real-time payment transactions: (1) Accessible: 7×24 operational environment, faster transactions, widely available to merchants, customers and corporate customers, available to all banks, wide range of electronic payment and delivery choices and national and global reach; (2) Branded: Banks and merchants can add their own brand, value added services and loyalty programs; (3) Cost and Revenue Effective: Value and risk of the service are commensurate with price and income; (4) Finality: Payment is final and irrevocable; (5) Information: Presentation of detailed payment related information and the protection of data is built in to meet privacy requirements; (6) Regulatory: Clear risks, responsibilities and actions; (7) Secure: User authentication, non-repudiation, transaction security, and operational and system security are provided; and (8) Interoperability: ECTS interoperates with existing payment infrastructures using open or widely used standards.

Thus, ECTS presents the framework which supports a new real time payment transaction infrastructure. ECTS will be the facilitator of electronic presentment and will support other services such as financial EDI, electronic benefits transfer, etc.

An advantage of system is to reduce and/or eliminate fraud and to provide "good funds" to merchants. (Merchants currently lose billions each year to fraud.) Present systems only memo post to consumer accounts and do not have a "hot file" for bad cards; as a result, merchants may not get paid in the long run. The real time system of the invention, at the outset, will either reject a transaction because of a bad card detected in the "hot file" so that the merchant can immediately stop the transaction, or, if approved, funds will be automatically credited to the merchant's bank and will be "good funds." A debit transaction from a customer's account not having sufficient funds will not be approved.

From a consumer standpoint. the system is a card system in which the card provides a high level of security; the chip card is the computer that runs the system; the system is "turned on" by the card held by the consumer; the consumer's PIN or biometric or other verification activates the process. As used herein and in the drawings, the system card is denoted a "BITS" card or a "chip card."

The drawings are understood with reference to several data flow models that describe an electronic transaction: flows between the buyer and the seller, flows between the buyer, the seller and their respective financial institutions, and flows between the buyer, the seller, their respective financial institutions and ECTS.

Figure 1B:
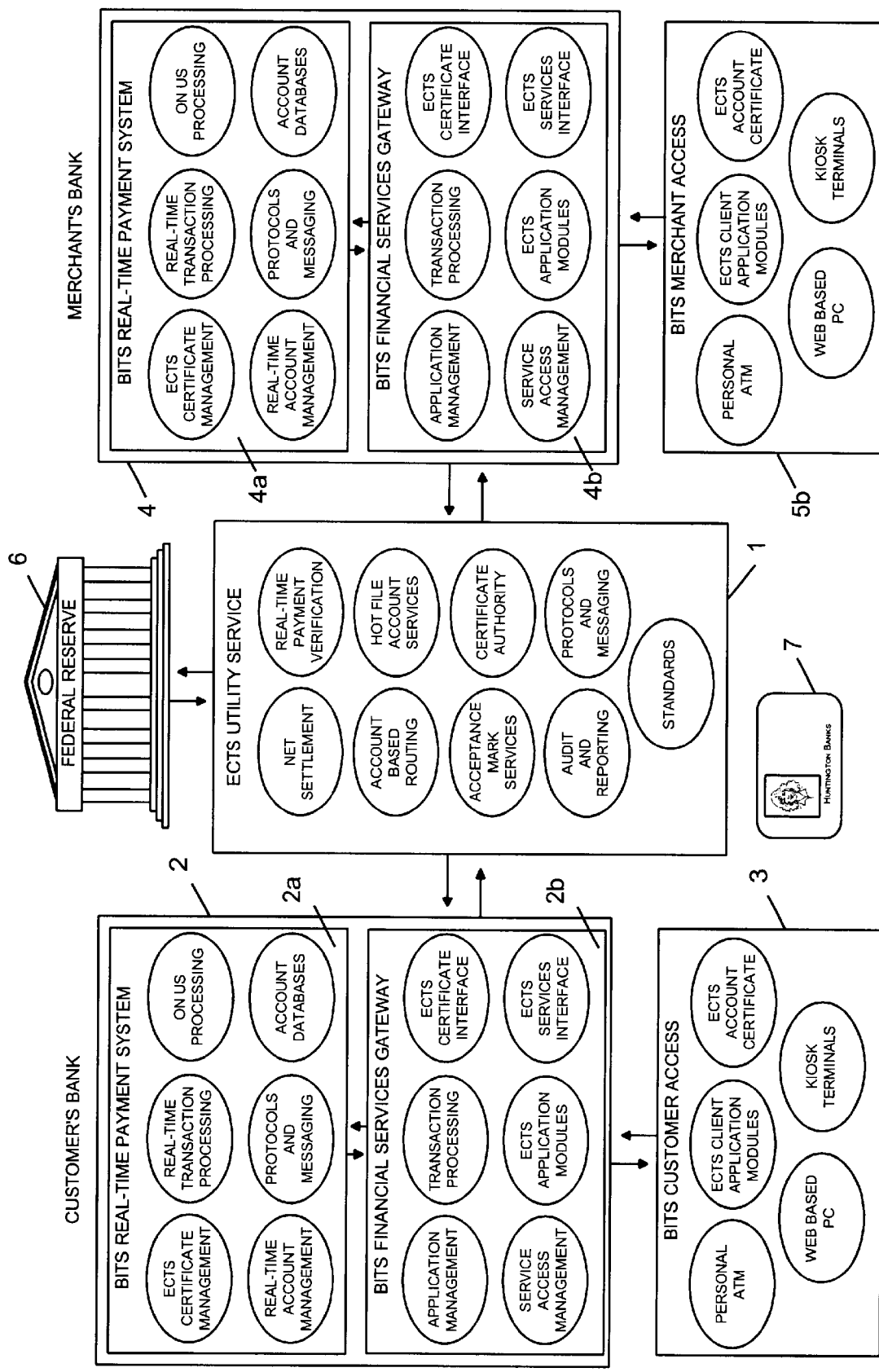

While the drawings have been briefly characterized above, a more detailed explanation of the drawings with reference to the invention is set forth below:

FIGS. 1A and 1B

FIG. 1A (and FIG. 1B with corresponding numerical identifiers) illustrate the overall ECTS infrastructure from the perspective of ECTS 1 as the master service provider interfacing with a customer's bank 2 and access mechanisms to the bank 3, and a merchant's bank 4 and access mechanisms to the merchant's bank 5A and 5B. The ECTS 1 interrelates with the federal reserve 6 or other central monetary system for periodic net settlement among members. The permitting application management, transaction processing, ECTS certificate interface, service access management, ECTS application modules and an ECTS services interface.

BITS merchant access mechanisms 5 to merchant's bank 4 include a web based PC, kiosk terminals by way of an ECTS account certificate, personal ATM, and ECTS client application modules for individualized services.

FIG. 2

Figure 2:
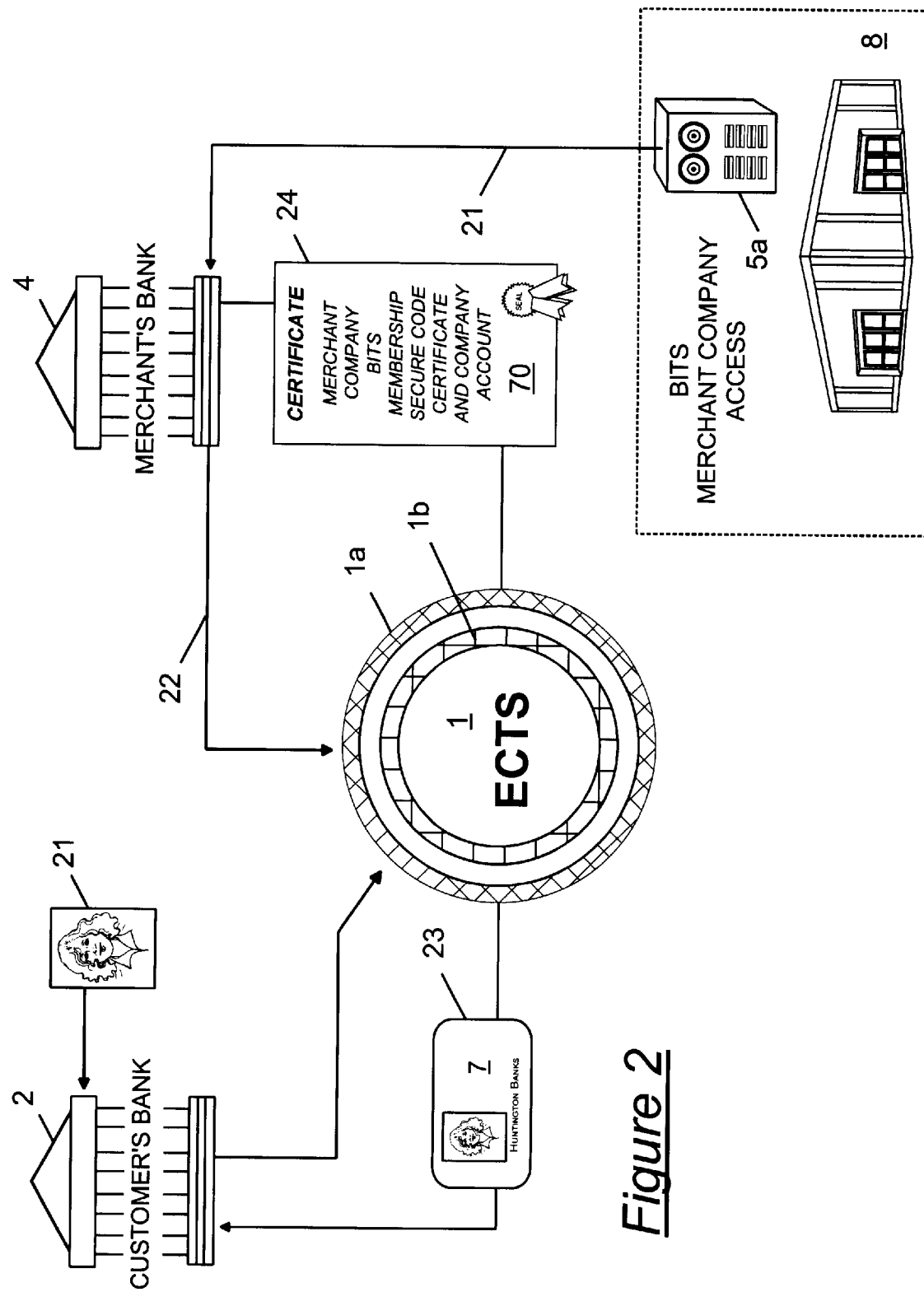
FIG. 2 shows the process of customer and merchant acceptance into a provider's ECTS system, sequentially in the steps labeled 21, 22, 23 and 24.

FIG. 2 shows the process of customer and merchant acceptance into a provider's ECTS system. BITS membership and card issuance occur sequentially with regard to a customer and merchant in the steps labeled 21, 22, 23 and 24.

At the customer's bank 2, a customer applies for BITS membership and lists what merchant companies to pay via bill presentment/bill pay services; at the merchant's bank 4, merchant company 8 applies for BITS membership and bill presentment/bill pay services, step 21. Next, the customer's bank 2 and the merchant's bank 4, respectively, send the BITS applications to the ECTS 1, step 22. The ECTS 1 issues a bank branded BITS card 7 and secure code certificate to the customer and accepts the merchant company's application, step 23. Finally, the ECTS 1 issues the merchant company a BITS membership secure code certificate and company account 70, step 24.

Figure 3A:
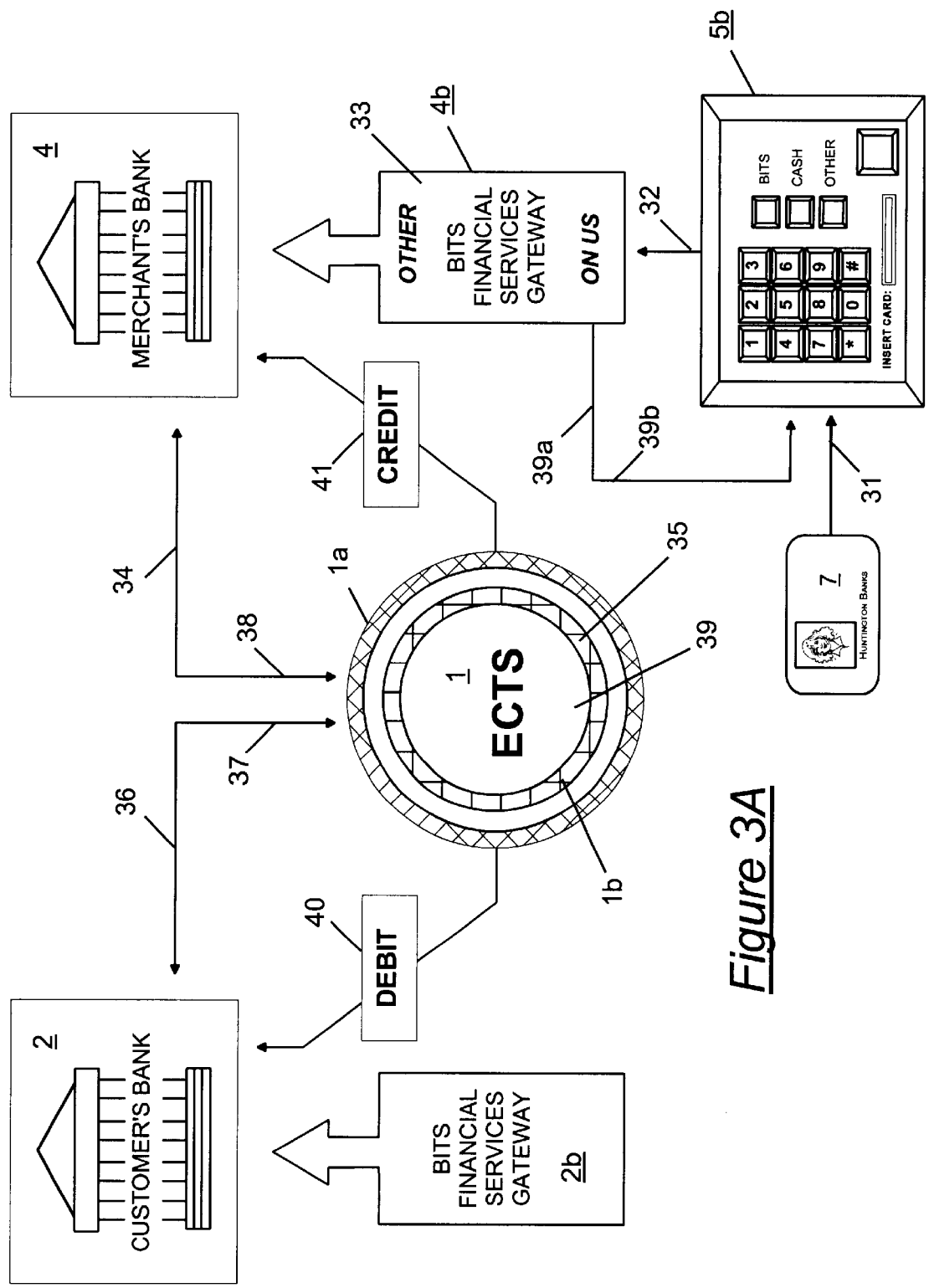
FIGS. 3A and 3B illustrate the system in use with a point-of-sale transaction through steps labeled 31 through 40.
Figure 3B:
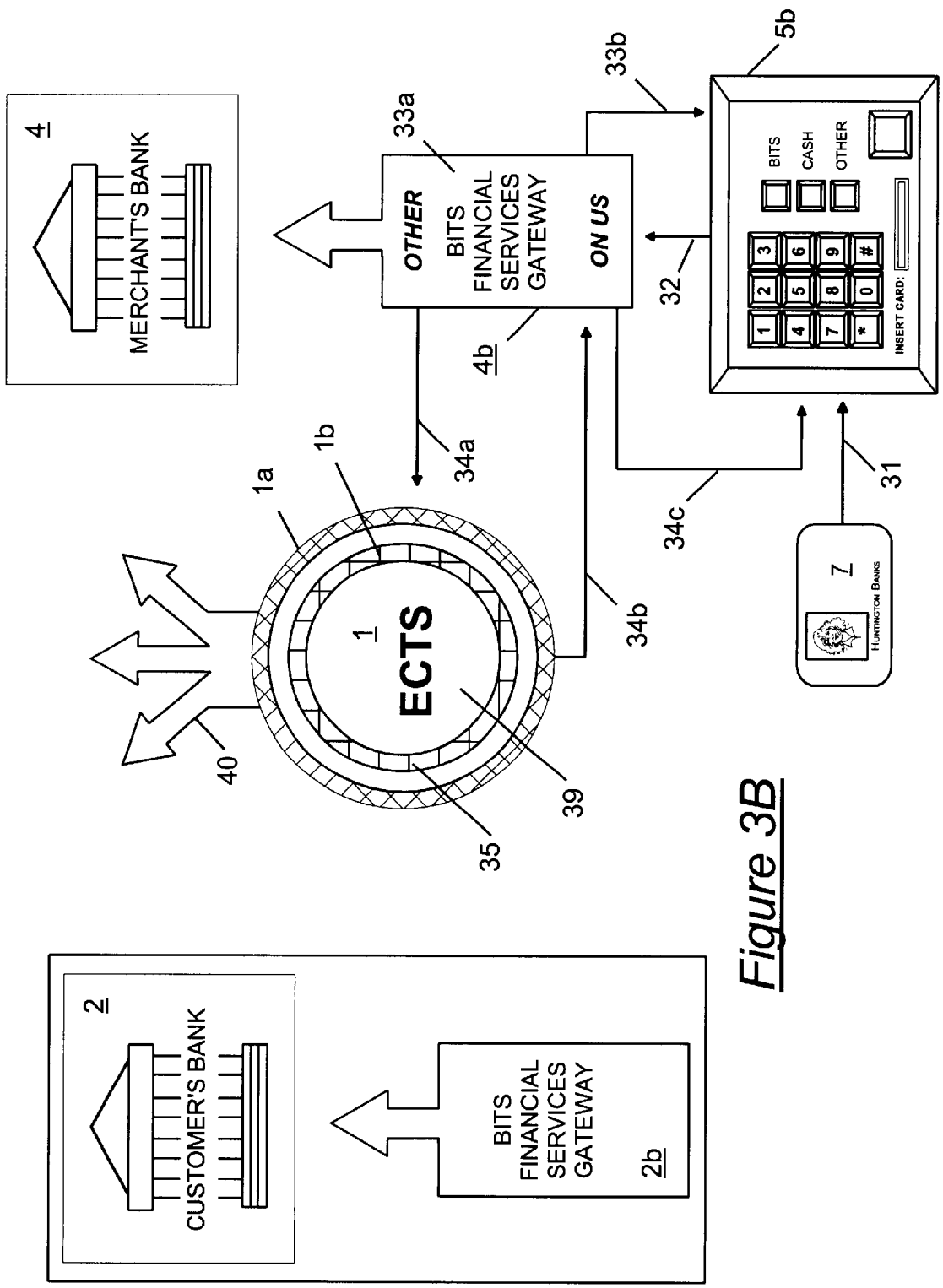
Figure 3C:
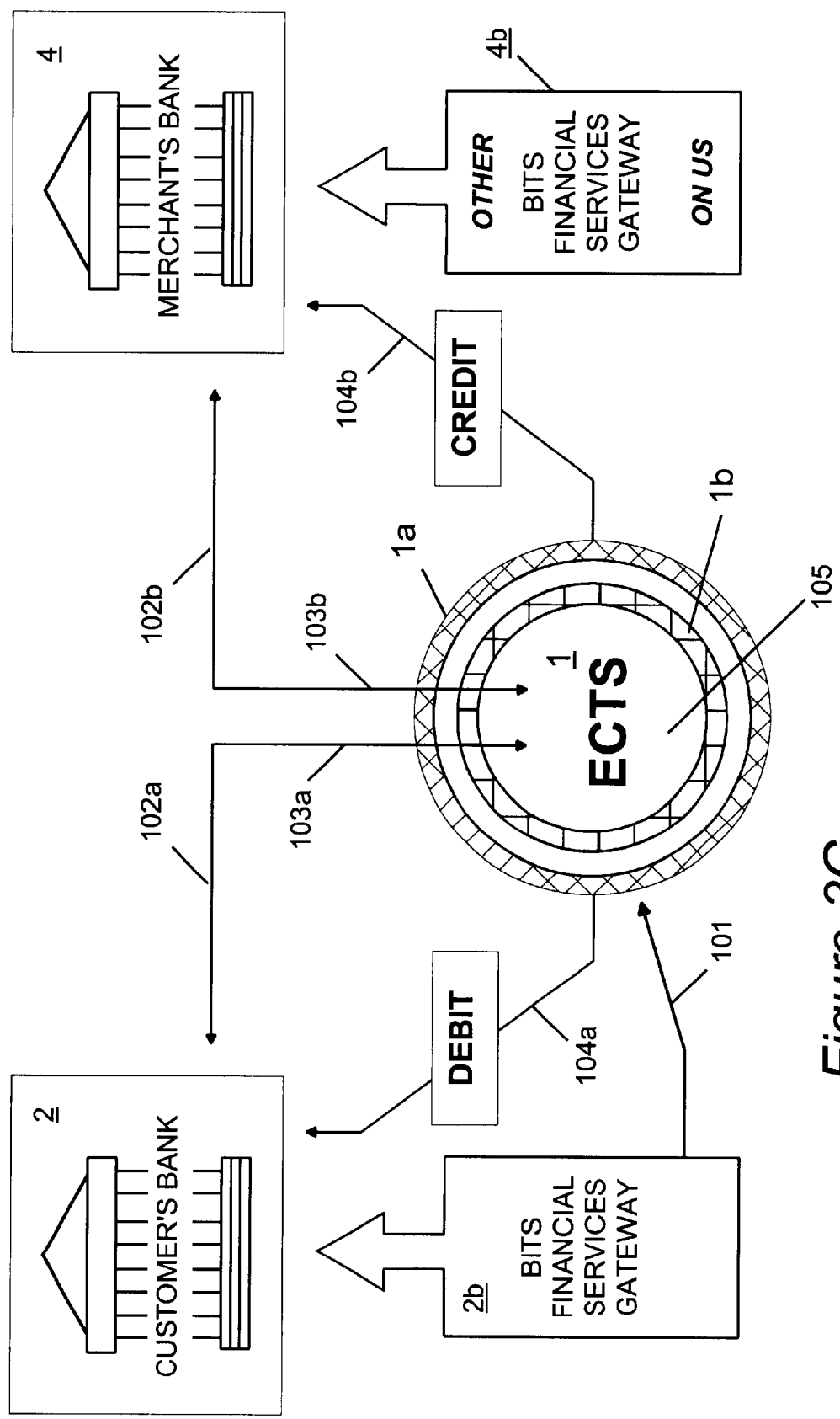
FIG. 3C illustrates the sequence of real time payments in the invention once information passes through the hot file to the ECTS.

FIGS. 3A, 3B and 3C

FIG. 3A illustrates a participant's purchase of an item, such as a book, at the merchant point of sale sequentially in the steps labeled 31, 32, 33, 34, 35, 36, 37, 38, 39, 39a, 39b, 40 and 41.

If a customer wishes to purchase a book with a BITS card 7 at the point of sale, the customer swipes the card 7 and selects BITS (real-time debit) as an option, step 31. Customer account information is sent to the merchant's financial service provider, step 32. The merchant company 8, having been accepted for BITS membership in accordance with FIG. 2 as an ECTS endorsed financial service provider, is connected to the merchant bank 4 through the BITS financial services gateway 4b. The financial service provider sorts the payment request into either ON US or OTHER. It processes ON US transactions and sends all OTHER transactions to the ECTS 1, step 33. All other payment information is sent to the ECTS 1.

Next, the ECTS 1 sends an inquiry to the merchant's bank 4: "Is there an open merchant account?", step 34. The ECTS 1 processes an inquiry "Is this a valid customer bits account?" by passing the payment information through the hot file 1b, step 35. The ECTS 1 sends an inquiry to the customer's bank 2: and "Are the funds available in customer's account?", step 36. The customer's bank 2 responds YES/NO the funds are available, step 37. The merchant bank 4 responds YES/NO there is an open merchant account, step 38. In this manner, the ECTS 1 sorts payment information, sends inquiries, and manages settlement, step 39.

Depending on the inquiry responses in steps 37 and 38 and whether the customer BITS account is valid, the transaction is processed and transaction information is transmitted to the customer as either "The transaction is complete the authorization number is #00000000", step 39a, or "The transaction is not authorized. UNAUTHORIED", step 39b. If the answer to each inquiry is YES, the ECTS 1 debits the account of the customer at the customer's bank 2, step 40 and credits the account of the merchant at the merchant's bank 4, step 41.

FIG. 3B illustrates presentment at the point of sale sequentially in the steps labeled 31, 32, 33, 33a, 33b, 34a, 34b, 34c, 35, 39 and 40. First, a customer wishes to purchase an item (e.g., a book) with a BITS card 7 at the point of sale. The customer swipes the card 7 and selects BITS (real-time debit) as an option, step 31. Customer account information is sent to the merchant's merchant's financial service provider presents ON US invoices to a customer billbox, step 42a. The merchant's financial service provider sends all OTHER customer statements/invoices to the ECTS, step 43. The ECTS 1 then sorts and distributes invoices to the customer's financial service provider, also a member of the ECTS 1, step 44. The ECTS 1 sends customer statements/invoices in standard format to the customer's ECTS endorsed financial service provider, step 45. The issuing customer bank 2 receives the customer invoices and presents them to the customer's billbox, step 46. The customer 21 accesses his or her billbox from any personal computer R1, PATM R2, or kiosk R3 and approves the invoices for payment, the payment amount (including partial payment) and the date of payment, step 47.

Figure 5A:
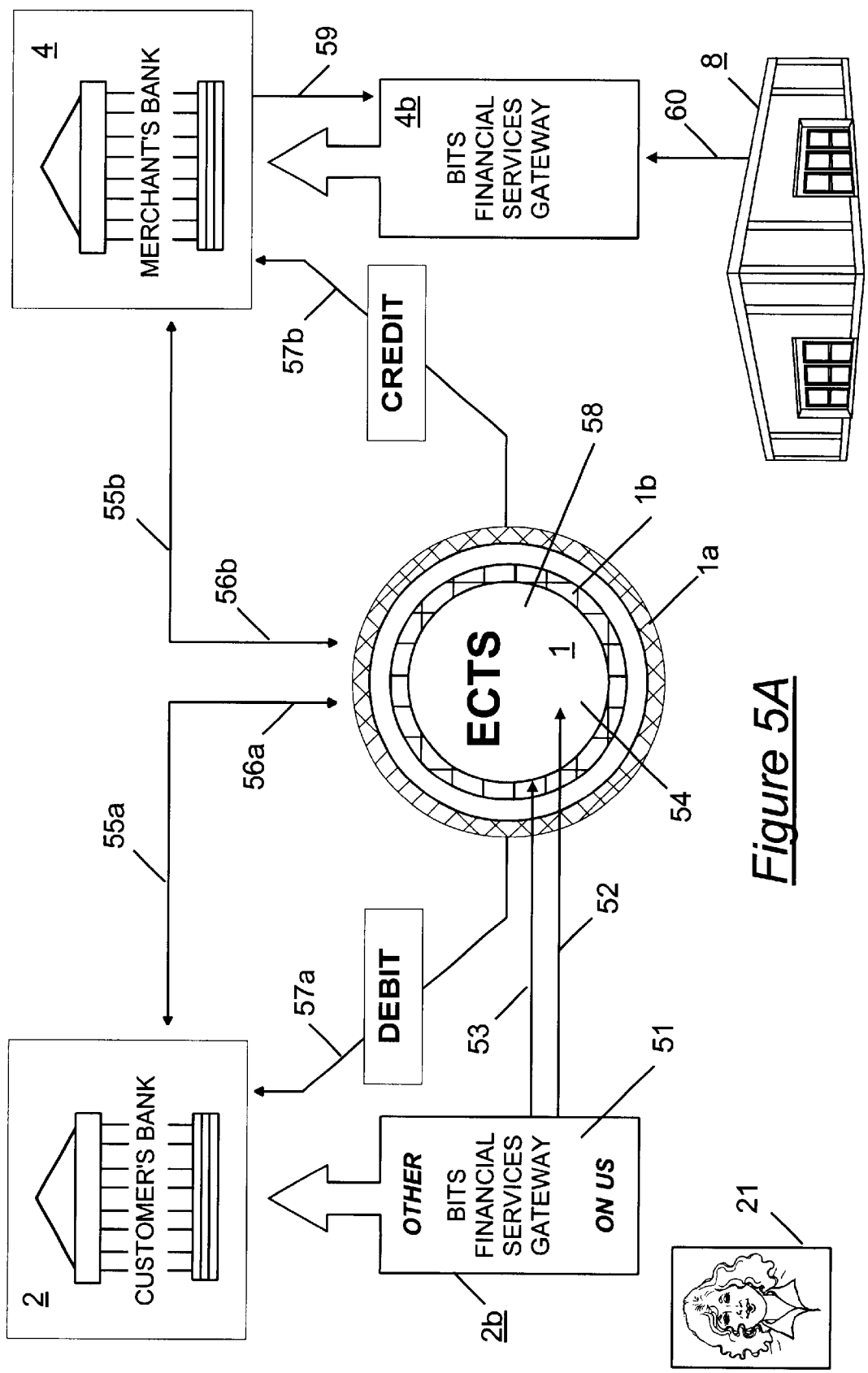
FIG. 5A shows the bill payment feature of the ECTS in the steps labeled 51–54, 55A, 55B, 56A, 56B, 57A, 57B, 58 and 60.
Figure 5B:
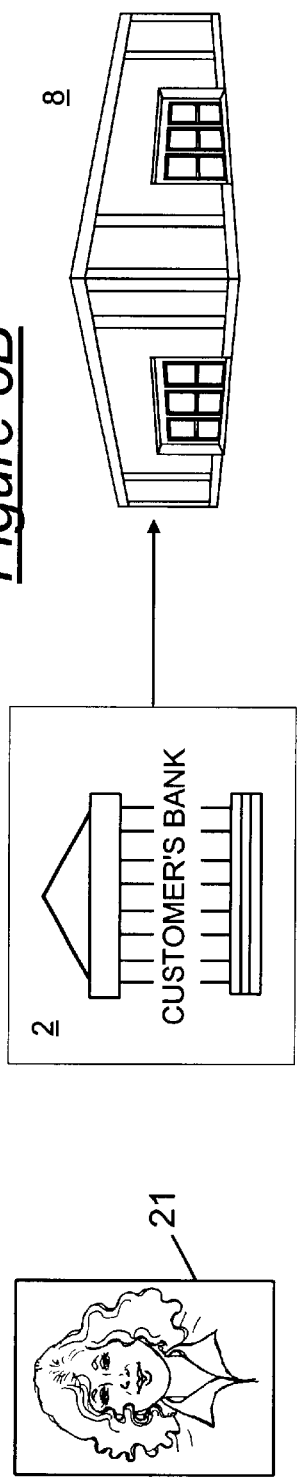
FIGS. 5B and 5C show bill presentment and pay scenarios.
Figure 5C:
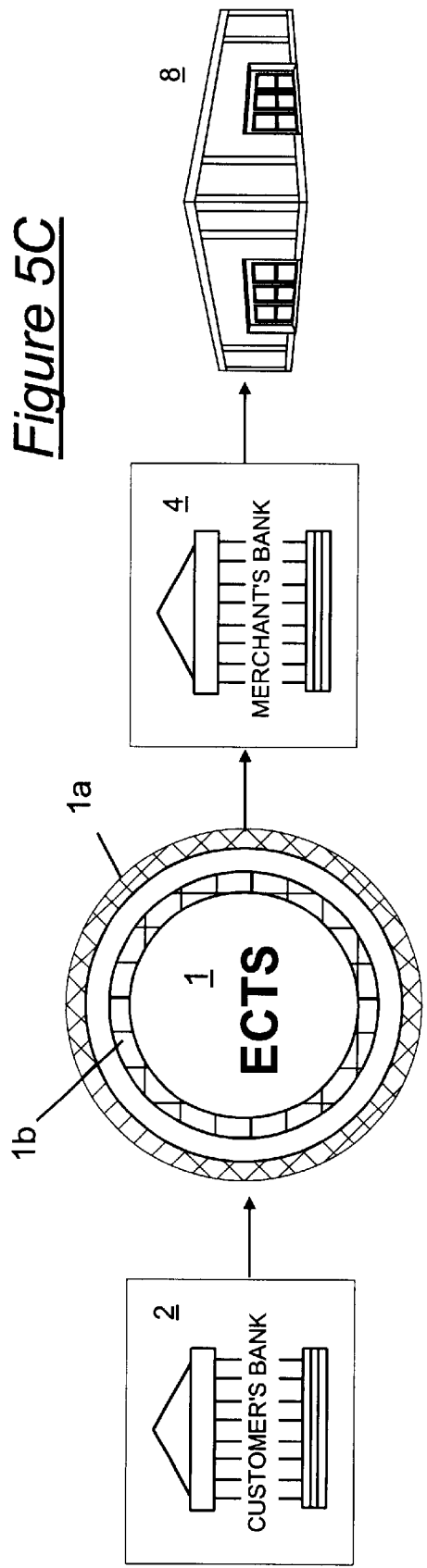

FIGS. 5A, 5B and 5C

Figure 4:
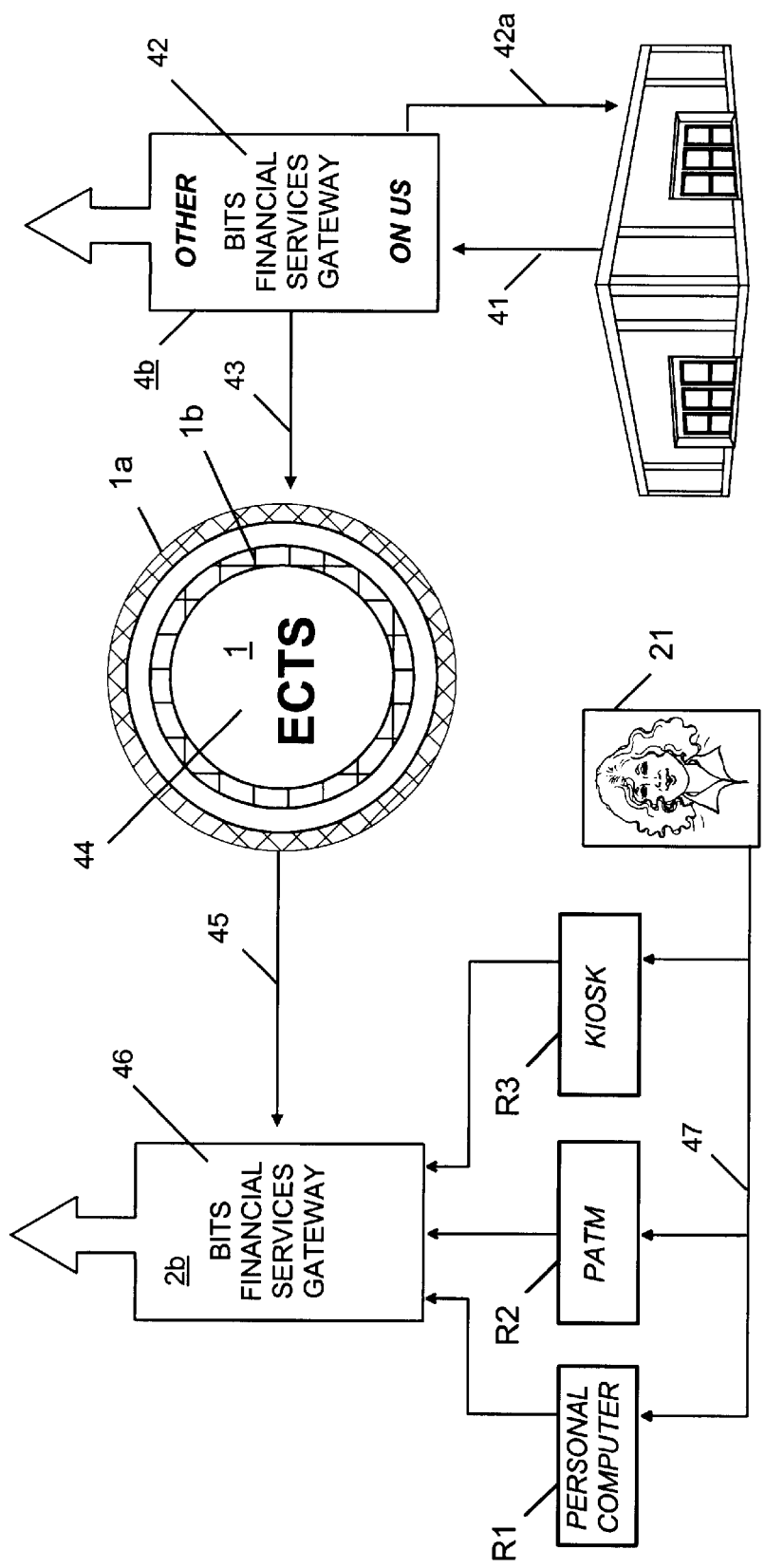
FIG. 4 shows an electronic bill presentment feature of the ECTS in the steps labeled 41 through 47.

FIG. 5A illustrates a bill payment system sequentially by the steps labeled 51, 52, 53, 54, 55a, 55b, 56a, 56b, 57a, 57b, 58, 59 and 60. First, once the customer 21 approves invoices for payment, the payment amount and date of payment in accordance with FIG. 4, the customer's ECTS endorsed financial service provider sorts payment information into two categories: ON US and OTHER, step 51. The financial service provider processes all ON US payments. All other payment information is sent to the ECTS 1, step 52. Next, the ECTS 1 processes an inquiry "Is this a lost or stolen BITS card?" by passing payment information through the hot file 1b, step 53. The ECTS 1 sorts payment information, step 54 and issues an inquiry to the customer's bank 2: "Are the funds available in customer's account?", step 55a. The ECTS 1 also issues an inquiry to the merchant bank 4: "Is there an open merchant account?", step 55b. The customer's bank 2 sends the ECTS 1 a response YES/NO the funds are available, step 56a. The merchant's bank 4 sends a response YES/NO there is an open merchant account, step 56b.

If both responses in steps 56a and 56b are YES and the BITS card 7 is not lost or stolen, the ECTS 1 debits the customer's account at the customer's bank 2, step 57a and credits the merchant's account at the merchant's bank 4, step 57b. Next, the transaction is recorded at the ECTS 1 for net settlement, step 58. The acquiring bank 4, through the merchant's ECTS endorsed financial service provider, updates merchant's paidbox with available "good" funds information, step 59. Finally, the merchant 8 views its paidbox located at its financial service provider for available funds information, step 60.

FIGS. 5B and 5C illustrate BITS bill presentment/bill pay scenarios. FIG. 5B shows the bill presentment/bill pay scenario where the merchant 8 is a BITS member at the customer's bank 2. In this scenario, the customer's bank 2 notifies the merchant company 8 to present the customer's bill via the BITS bill presentment/bill pay service.

FIG. 5C shows the bill presentment/bill pay scenario where the merchant 8 is BITS member at another bank. In this scenario, the customer's bank 2 notifies the ECTS 1 which notifies the merchant's bank 4 to instruct the merchant company 8 to present customer's bill via the BITS bill presentment/bill pay service.

FIGS. 6A, 6B AND 6C

Figure 6A:
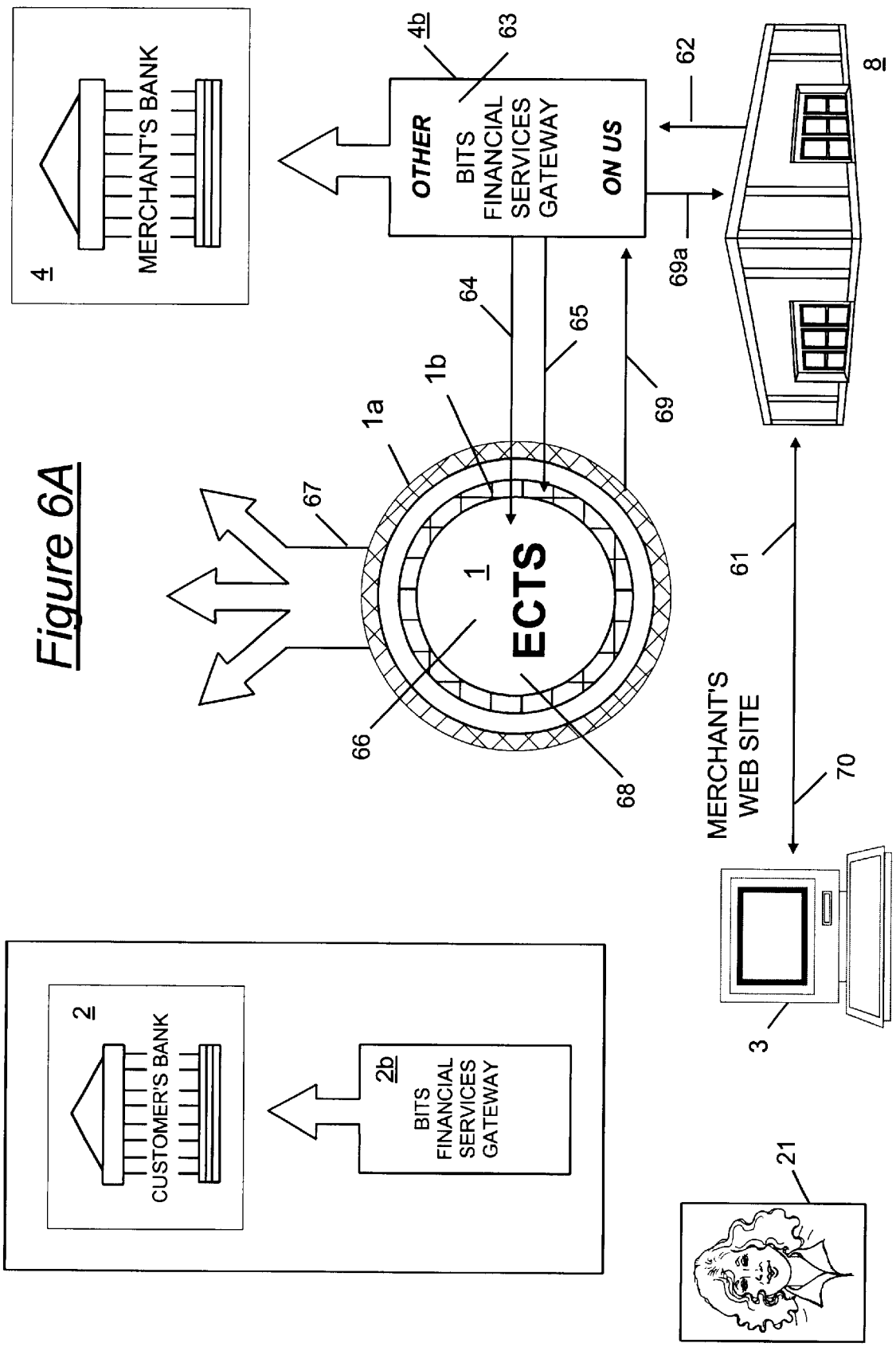
FIG. 6A illustrates an inquiry from a home access terminal such as a PC in steps 61 through 70.

FIG. 6A illustrates presentment from a personal computer sequentially in the steps labeled 61, 62, 63, 64, 65, 66, 67, 68, 69, 69a and 70. First, a customer 21 visits the merchant's web site 3 and sends a request to purchase a book from the merchant 8, step 61. Customer account information is sent to the merchant's financial service provider, step 62. The merchant's financial service provider sorts payment information into two categories: ON US and OTHER, step 63. It processes all ON US Payments. All OTHER payment information is sent to the ECTS 1, step 64. The ECTS 1 processes an inquiry "Is this a lost or stolen BITS card?" by passing payment information through the hot file 1b, step 65. The ECTS 1 sorts payment information, step 66 and the transaction enters payment scenarios, step 67. The transaction is recorded at the ECTS 1 for net settlement, step 68. Authorization information is routed through the merchant's financial service provider, step 69 and back to the merchant 8, step 69a. Finally, the merchant 8 sends authorization and shipment information to the customer 21, step 70.

Figure 6B:
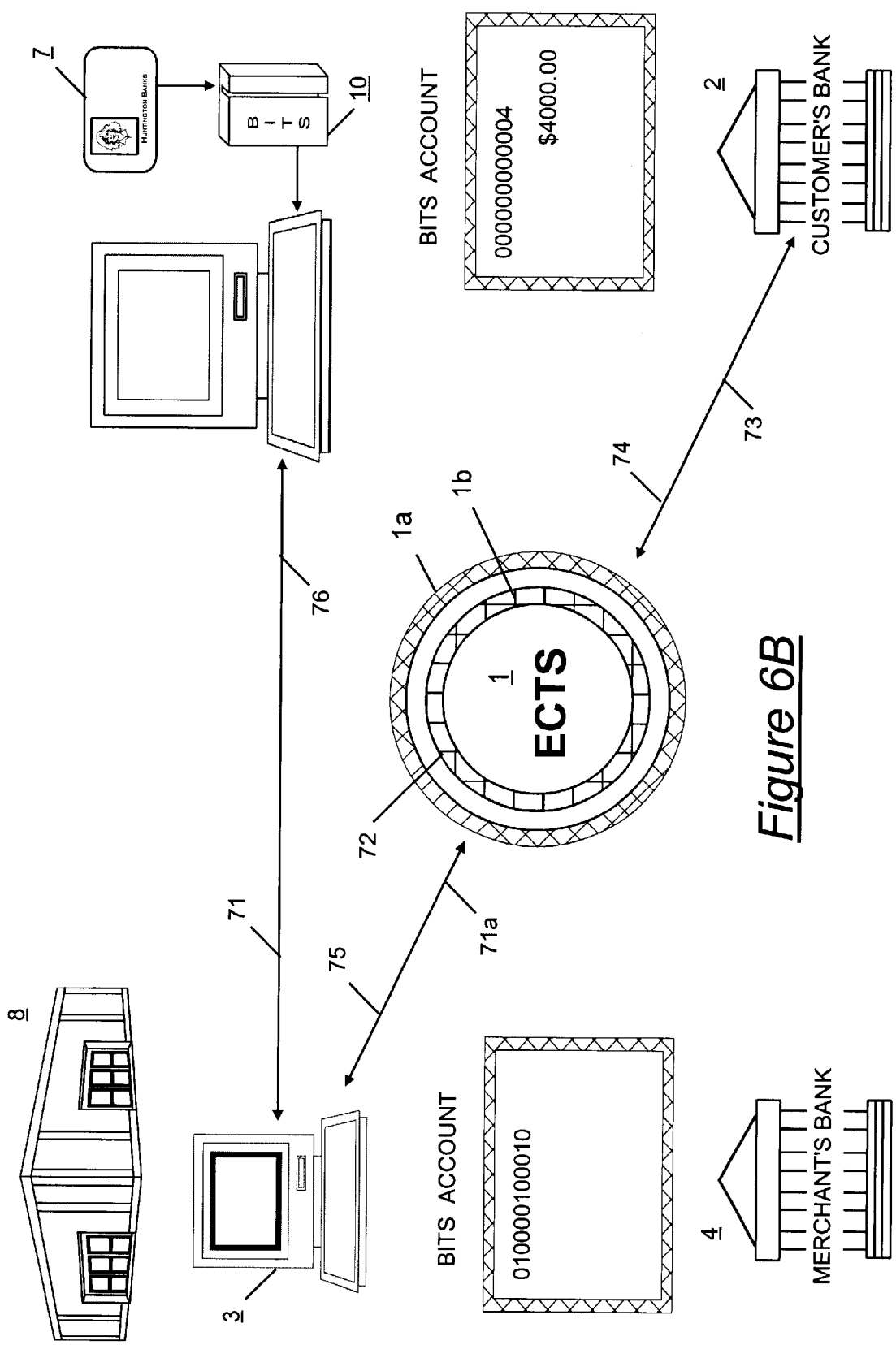
FIGS. 6B and 6C, respectively, illustrate an inquiry from a home PC and a transaction from a home PC using a BITS card reader with a modem connection to the ECTS and the BITS network.

FIG. 6B illustrates a BITS inquiry from a home PC sequentially in the steps labeled 71, 71a, 72, 73, 74, 75 and 76. First, a customer 21, equipped with a BITS card 7, a home based Bits card reader 10 with modem connection to ECTS and BITS van, wishes to make a $200 PC purchase from the merchant's web site 3, step 71. The customer's inquiry passes through the merchant company 8 to the ECTS 1, step 71a. The ECTS 1 confirms the customer's BITS card 7 is valid by passing payment information through the hot file 1b, step 72. Next, the ECTS 1 sends an inquiry to the customer's bank 2 "Does customer have fluids available to make the purchase?", step 73. The customer's bank 2 responds YES/NO the funds are available, step 7). If the customer's bank 2 responds "Yes funds are available" the ECTS 1 notifies the merchant company 8 that funds are available and the BITS card purchase is authorized, step 75. Finally, the customer 21 is notified via the merchant's web site 3 that the purchase is authorized step 76).

Figure 6C:
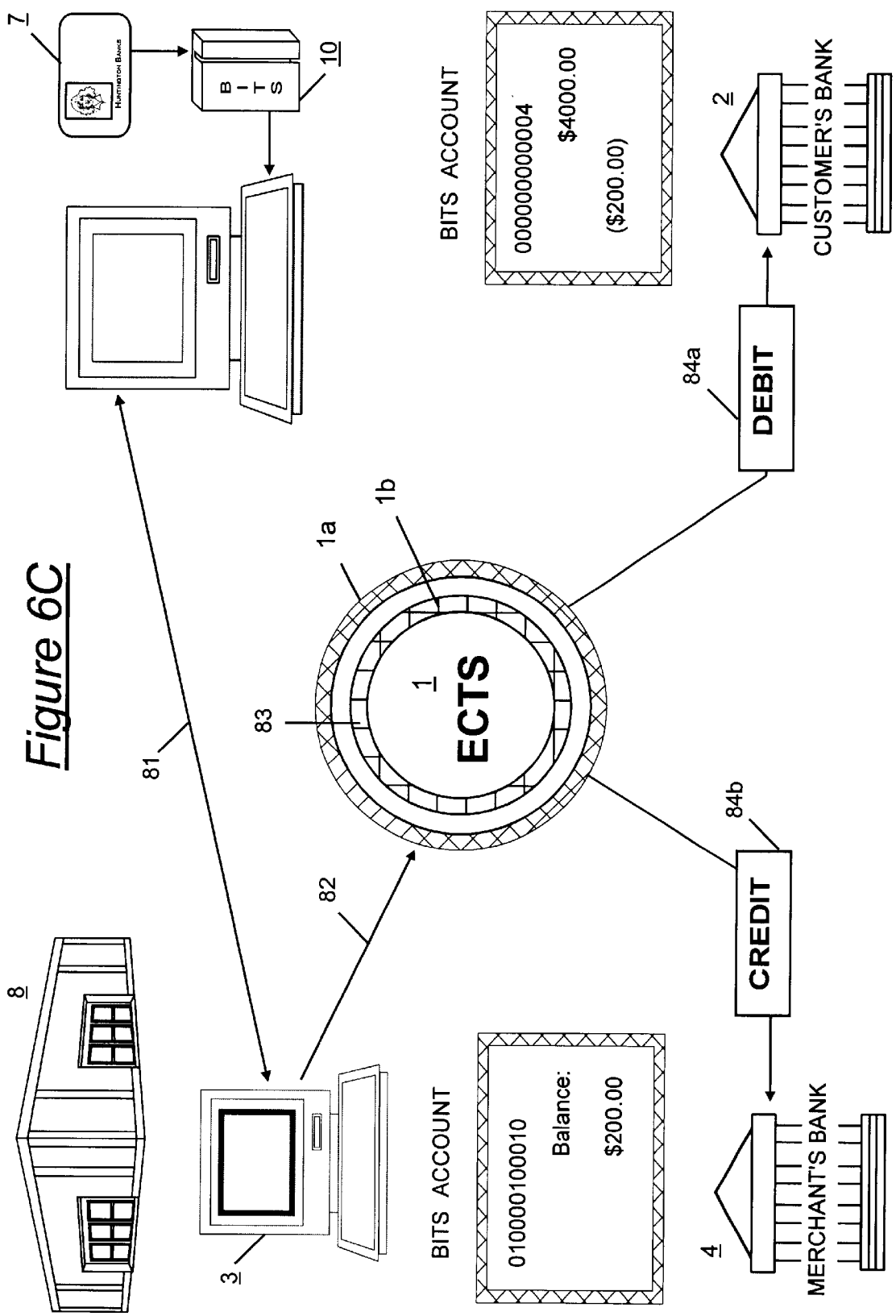

FIG. 6C illustrates a BITS Transaction from a home PC sequentially in the steps labeled 81, 82, 83, 84a and 84b. Once the customer 21 is notified that the purchase is authorized in accordance with FIG. 6B, the customer 21, equipped with a BITS card 7, a home based BITS card reader 10 with modem connection to ECTS and BITS van, makes the purchase, step 81. The transaction is completed via modem connection, step 82. The ECTS 1 confirms that customer's BITS card 7 is valid by passing payment information through the hot file 1b, step 83.

Finally, the ECTS 1 debits the customer's account at the customer's bank 2 in the amount of $200, step 84a and credits the merchant's account at the merchant's bank 4 in the amount of $200, step 84b.

FIG. 7

Figure 7:
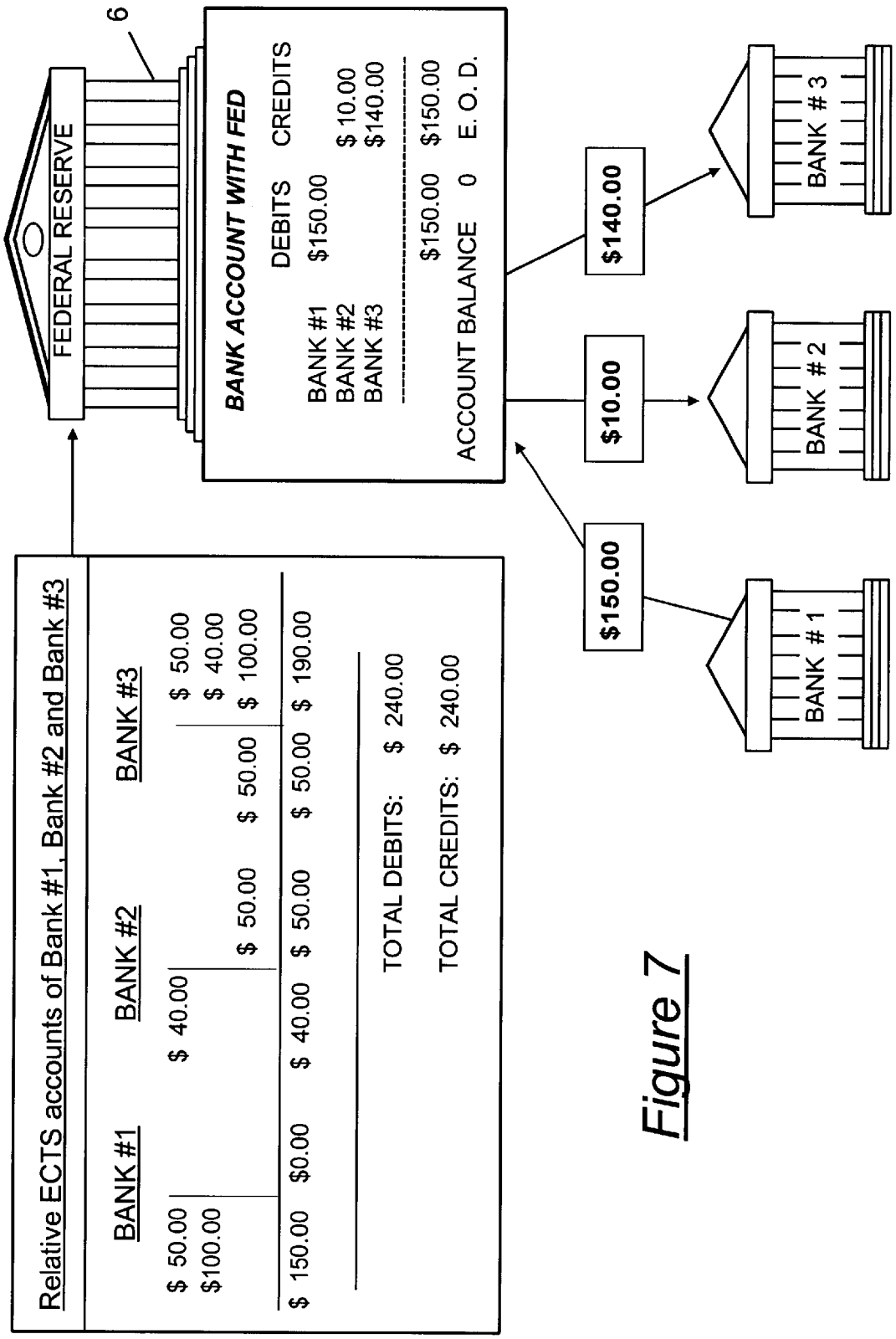
FIG. 7 illustrates net settlement accomplished by the ECTS through the Federal Reserve.

FIG. 7 illustrates an example of net settlement with same day finality.

The drawings and the operation of the invention are further described below:

With reference to the overall configuration of the system shown in FIGS. 1A and 1B, the function performed by the Federal Reserve in the system is as the daily settlement agent for the transactions. The ECTS is taken out of the transaction when the transaction is sent to the consumer's bank and the consumer and merchant have the same bank. The ECTS account certificate is a digital signature that allows a customer to access the system. While certain functions of the consumer's bank can be outsourced, outsourcing does not change how the system works.

FIGS. 1A and 1B show the overall infrastructure of the ECTS. This data flow is predicated on the need for offering value added services that cannot be attained directly from the buyer to the seller. By inserting an additional entity into the transaction flow, the process remains easy to use, convenient, value-conscious and cost effective.

FIG. 1A (and FIG. 1B with corresponding numerical identifiers) illustrate the overall ECTS infrastructure from the perspective of ECTS 1 as the master service provider interfacing with a customer's bank 2 and access mechanisms to the bank 3, and a merchant's bank 4 and access mechanisms to the merchant's bank 5A and 5B. The ECTS interrelates with the Federal Reserve 6 or other central monetary system for periodic net settlement among members.

As a master provider of utility services, the ECTS provides to member banks net settlements, real time payment verification, an account based routing service, hot file account services, acceptance mark services, certificate authority, audit and reporting service and protocols and messaging. In FIGS. 1A and 1B, the customer's bank 2 includes a real time payment system including the features of certificate management, real time transaction management, on-us processing, real time account management, protocols, messaging and account databases, and a financial services gateway including the functions of applications management, transaction processing, certificate interface, service access management, application modules and the ECTS interface. As shown, customer access to the ECTS member bank may be intranet or web-based or through kiosk terminals by way of an account certificate or through a personal ATM. ECTS also allows client application modules for individualized services.

As with the consumer's bank, merchant's bank 4 includes functions of ECTS certificate management, real time transaction management, ECTS on-us processing, real time account management, ECTS protocols and messaging and ECTS account databases. The bank 4 similarly provides a financial services gateway permitting applications management, ECTS transaction processing, ECTS certificate interface, service access management, ECTS application modules, and ECTS services interfaces. Merchant access mechanisms to bank 4 shown in box 5 of FIG. 1B include web, POS, ECTS POS terminals, ECTS account certificate, business applications and individualized ECTS client application modules. The BITS card or chip card that activates the system is shown at 7.

FIGS. 3A and 3B illustrates a participant's purchase of an item, such as a book, at the merchant point of sale of an ECTS member bank participant merchant. If the customer wishes to purchases a book with a BITS card at the point of sale, the customer swipes the card in a reader and selects BITS (real time debit) as an option on the card reader. Customer account information is sent to the merchant's financial service provider that identifies the payment request into either On us or Other. It processes On us transactions directly at the bank as both the customer and merchant have accounts at the bank. All Other payment information is sent to ECTS. The ECTS sorts payment information, sends an inquiry to the customer bank "Is this a valid customer BITS account?" and manages settlement by querying: "Are the funds available in the customer's account?" and "Is there an open merchant account?" Depending on whether the inquiry responses are yes or no the funds are available and yes or no there is an open merchant account, the transaction is processed. When both are yes, a debit is issued from the account of the customer at the customer bank and a credit is issued to the account of the merchant and the merchant bank. ECTS settlement of debits and credits between and among member banks occurs periodically, at least daily, through the Federal Reserve.

In this example, in the completion of the sale transaction, the consumer bank and merchant bank do not communicate directly; while information may be transmitted through the bank's local intranet, the verification, debiting and crediting is all done via the ECTS. amount and date of payment. The approval is transmitted to the customer's ECTS member bank. The bank sorts payment information into two categories: On us and Other. The bank internally processes On us payments; Other payments are sent to the ECTS which sorts payment information, sends appropriate inquiries and manages settlement according to the inquiry: "Are the funds available in customer's account?" Depending on the answer, "Yes, funds are available," the ECTS debits the customer's account at the bank and ECTS credits the acquiring merchant bank for the merchant's account. The merchant bank updates the merchant paidbox with available "good" funds information and the company views the paidbox located at the financial service provider for available funds information.

As noted, the BITS card is a secure card by which positive identification of the user can be associated with a PIN, biometric verification such as ocular scan or thumbprint identification, or other means. As a smart card, the BITS card can also be a single card useful with multiple consumer accounts, such as an ordinary credit account, ATM access account, a debit card account, a department store account, an oil company account and the like, which card account the consumer may select at the point of purchase or which may be dictated at the point of purchase.

Data transmission may be over various networks such as a bank's ATM network or networks of bank ATM networks, intranets, or the public internet for efficiency and low cost. The ECTS is a switch that is a private platform for reception and transmission among members and members' customers serving the aforesaid functions. Access to the switch may be by any means as long as it is preferably secure. The system emulates everything the checking system does, and more, with the advantage of real time funds transfer that eliminates returns fraud, insufficient funds problems and returns. The system runs 24 hours per day with net settlement automatically occurring at a set interval (through a timer in the CPU), for example, every day at 2:00 p.m. EST. A firewall and hot file surrounds the ECTS (10 in FIG. 1A) to insure that the card transmitting is not stolen, that the user identification protocol is verified, and that the account at issue is an open account. Current card systems do not utilize such features in real time debiting and crediting good funds in a transaction. As an archive, the ECTS will maintain records and audit protocols for settlement verification. However, records are simplified because real time transactions do not involve delay and the transactions are accomplished directly between accounts. For encryption purposes, ECTS is the certificate holder, in essence, having the keys to the vault, accessible by a private key. Because of the real time factor, the ECTS will be the generator of good funds; there will be live real time presentment, non-reversible and without returns. Thus described it is evident that the ECTS is an improvement over current payment systems that are batch systems. While a debit card appears to work instantaneously, it does not because there is a delay between the posting of a debit and the actual transfer of funds. There is no conventional "posting" in the ECTS and the funds transfer is immediate. Further, the system requires only an access device which can be of any type. The system is all electronic and does not depend on paper. As noted, it can be combined with billing and payment functions, a credit facility, a mailbox, an internet messaging service, or other brand identifier or differentiating features adopted by a member financial service provider. For security purposes, redundant back-up master or mirror controllers can be provided at different locations.

What is claimed is:

1. An infrastructure system comprising:

a central processing unit defining an electronic commerce trust system, the system formed from a plurality of financial service provider members subscribing to a common standard having applicability throughout the trust system, the financial service provider members providing transaction processing services to pre-identified customer users and goods and services providers that are account subscribers with the financial service provider member and subject to the common standard of the system, the trust system being interconnected with a central monetary exchange mechanism having authority over the financial service provider members and the exchange of currency among the financial service provider members, the central processing unit further operatively interconnected to communicate with a correspondent processing unit at each one of the plurality of financial service provider members, the central processing unit maintaining a hot file means for authenticating users of the system and for restricting use of the system to subscribing members, said hot file including means for detecting identifications of accounts that are lost, stolen or discontinued and verification means for authenticating a customer user and a goods and services provider with respect to an account transaction, whereby access to the system is denied upon detection of a lost, stolen or discontinued identification or the failure of verification of authenticity;

the correspondent processing units of the financial service provider members being operatively interconnected through transaction access mechanisms linking customer users and goods and services providers with the financial service provider member;

the central processing unit providing non-revocable real time debit and credit transactions between and among accounts of the customer users and the goods and services provider account subscribers upon verification of: (1) the authenticity of the originator and the recipient of a debit/credit instruction with regard to a transaction involving accounts of the user and provider account subscribers when the instruction is received by the central processing unit from a transaction access mechanism, and (2) the availability of funds In the account to be debited in an amount sufficient such that funds in the amount of the transaction are immediately available in real time from the account to be debited for transfer to the account to be credited; the central processing unit further maintaining in substantially real time a record of the debits and credits incurred in the accounts of the customer users and the goods and services provider subscribers and a record of the aggregate debits and credits between and among the financial service provider members resulting from transactions of the member's account subscribers;

a settlement mechanism within the central processing unit for maintaining an aggregate log of debits and credits with regard to customer user and goods and services provider subscriber transactions processed with regard to financial service provider members and for calculating respective debits and credits owing and payable among the provider members;

a timer whereby at a predetermined time interval net settlement of accounts of the financial service provider members is effected by the transmission of the record of the aggregate debits and credits owing and payable by the provider members from the central processing unit to the central monetary exchange mechanism; and a means for providing an interconnection among participants in the system in a connection of a participant to one of an intranet, an internet, a World Wide Web or a network connection to the Internet.

2. The system of claim 1 in which the mechanism for system access is a terminal selected from the group consisting of a PC, a kiosk, and an ATM.

3. The system of claim 1 in which system access is effected by use of a smart card.

4. The system of claim 1 including a firewall surrounding the central processing unit.

* * * * *